(No Model.)
F. RISINGER.
BICYCLE.
No. 524,652. Patented Aug. 14, 1894.
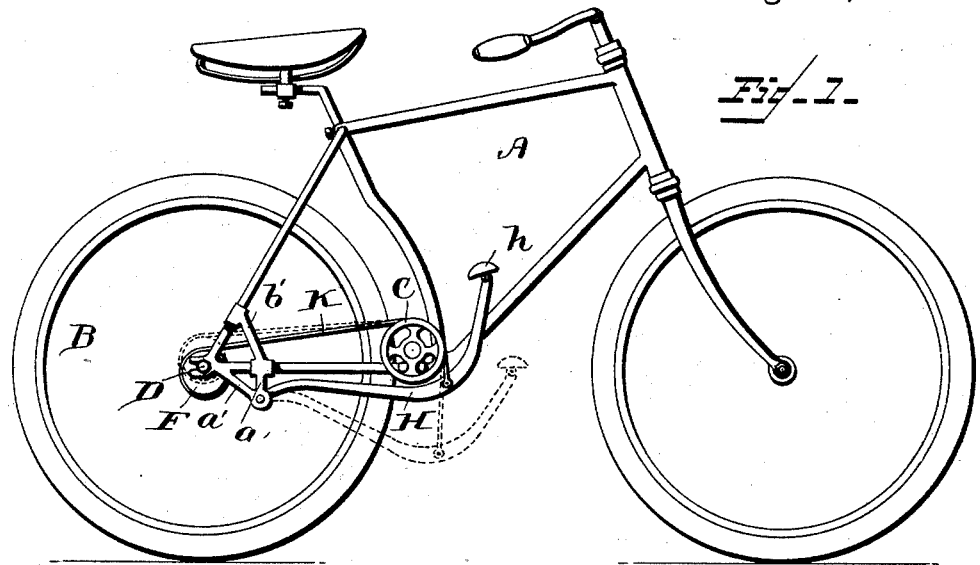
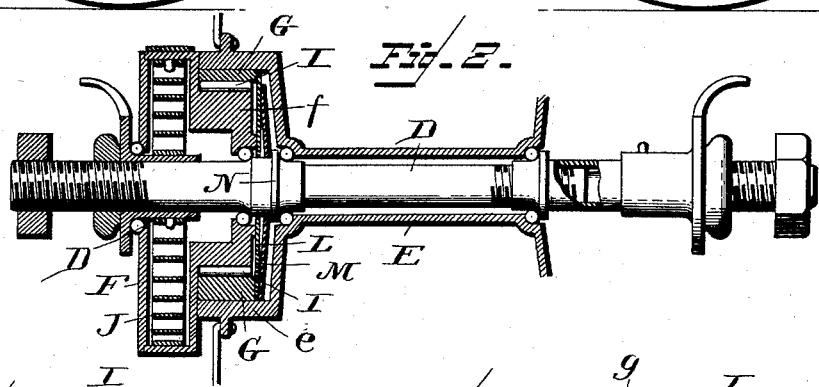
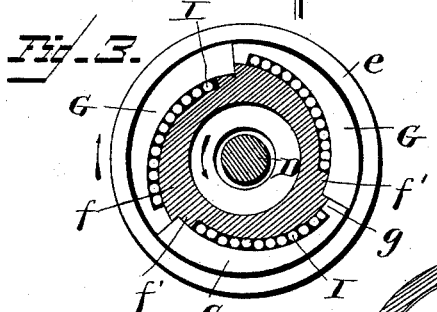
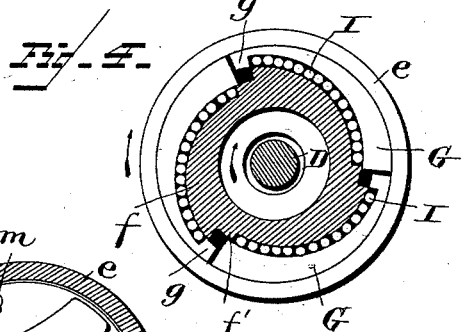
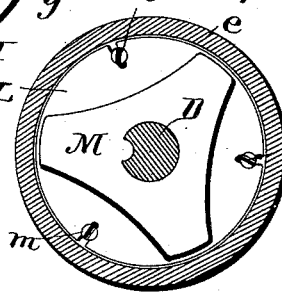
Witnesses
Albert Spieden
Van Buren Hillyard
Inventor
Frank Risinger
By Attorneys R. S. & A. P. Lacey

UNITED STATES PATENT OFFICE.

FRANK RISINGER, OF EAST LIVERPOOL, OHIO.

BICYCLE.

SPECIFICATION forming part of Letters Patent No. 524,652, dated August 14, 1894.

Application filed June 16, 1893. Serial No. 477,829. (No model.)

*To all whom it may concern:*

Be it known that I, FRANK RISINGER, a citizen of the United States, residing at East Liverpool, in the county of Columbiana, State of Ohio, have invented certain new and useful Improvements in Bicycles; and I do hereby declare the following to be a full, clear, and exact description of the invention, such as will enable others skilled in the art to which it appertains to make and use the same.

This invention relates to bicycles and more particularly to the propelling mechanism, and aims to increase the force of the stroke and enable the rider to vary the distance of the stroke at will.

The invention is especially designed to be applied to that class of bicycles commonly known as safeties in contra-distinction to upright machines.

As generally constructed safeties are propelled by crank mechanism and endless chains and sprockets. The present invention aims to substitute an intermittent grip mechanism for the crank mechanism without unnecessarily increasing the weight or detracting from the neat and light appearance of the machine.

The improvement consists of the novel features and the peculiar construction and combination of the parts which will be hereinafter more fully described and claimed and which are shown in the annexed drawings, in which—

Figure 1 is a side elevation of a bicycle embodying my invention, showing operation in dotted lines. Fig. 2 is a detail section view of the rear spindle or axle, parts being broken away and showing the hub and intermittent grip mechanism in section. Fig. 3 is a detail view showing the ratchet drum regaining itself and the hub rotating forward. Fig. 4 is a view similar to Fig. 3 showing the hub and ratchet drum turning together. Fig. 5 is a detail view showing the friction plate which connects the series of wedges together and holds them in proper relation.

The frame A of the machine may be of any desired construction and is provided at a convenient point in front of the rear wheel with the wheel C whose axis is about in the same horizontal plane with the axes of the wheels of the machine.

The rear wheel B is mounted on an axle or spindle D and has the outer ends of its hub E enlarged to receive the ratchet or cam portion $f$ of the spring drum F.

The spring drum F is eccentric relative to the ratchet portion $f$, the latter projecting from the inner side thereof and entering the base formed by the enlarged end $e$ of the hub.

A series of wedges G, one being provided for each cam or ratchet face of the ratchet portion $f$, curve in their length to correspond with the inner periphery of the part $e$.

A series of rollers I are interposed between the opposing edges of the wedges G and the cam or ratchet faces of the part $f$ to facilitate the movements of the said wedges when the propelling mechanism is in efficient service.

The wedges G have a shoulder $g$ at their smaller ends and the ratchet or cam faces have corresponding shoulders $f'$ at their inner ends to form stops between which the rollers I are held.

A flat spring J is inclosed within the drum F and has one end attached to the axle or spindle D and the other end fastened to the said drum F. Obviously, when the spring drum F is turned on the axle or spindle the spring J will be wound and when the said drum F is released the said spring J will unwind or regain itself and return the drum F to a normal position.

As the drum F is rotated forward the ratchet portion $f$ will advance and cause the wedges G to bind between the inner side of the part $g$ and the cam faces of the said ratchet portion and cause the drum and wheel to rotate together. When the drum F is released it will regain itself or return to a normal position without impeding the forward motion of the machine because the drum in regaining itself will release the wedges G and permit them to turn backward with the said drum without impeding the forward rotating of the hub.

The levers H are elbow shape and have pedals $h$ on the upper ends of the vertical extensions, and have their rear ends pivoted to short standards $a$ depending from the horizontal portion of the frame A. These depending standards $a$ are braced by short stays $a'$ and by braces $a^2$ which extend across the angle formed between the parts of the frame.

The rear ends of the levers H curve downward, as shown, to bring the center of motion as low as possible whereby the pedals receive a forward motion when pressed upon.

A thin strip of steel K is attached at one end to the drum F and is wound upon the same once or twice and has its other end attached to the lever H near the elbow and just in advance of the wheel C. This strip of steel passes over the said wheel C and is guided thereby when the levers are actuated to cause the power to be properly applied to the drum F for the purpose of propelling the machine. The strip of steel being thin can be wrapped around the drum F without giving a bulky appearance to the latter so that when the pedals are pressed upon the wheel C may be turned and carry the machine forward.

A friction plate L is centrally apertured to receive the axle or spindle and is provided near its outer edge with notches m to receive screws which enter the wedges G and connect the latter to the said plate.

A triangular shaped tension plate M is mounted on the axle or spindle and is confined between a flanged nut N and the said friction plate L to hold the latter firmly in place.

By reason of the drum F being eccentric the power varies from beginning to finish of the stroke as is evident on reference to Fig. 1 because the position of the drum varies as it turns upon the axle or spindle thereby varying the same.

Having thus described my invention, what I claim, and desire to secure by Letters Patent, is—

1. In a safety bicycle the combination with the frame and elbow shape levers pivoted to the lower portion of the frame and having pedals on their vertical standards, of a spring drum mounted on the axle with the rear wheel and having a ratchet portion which projects within the enlarged end of the hub of the said wheel, gripping devices between the ratchet portion of the drum and the enlarged face of the said hub, and a strip connected at one end with the said elbow lever and passing over a guide wheel, and having the other end wound upon and attached to the said drum, substantially as set forth.

2. In a propelling mechanism for bicycles, the combination of a wheel having its outer end enlarged, the spring drum mounted on the same axle with the wheel and having an eccentric ratchet portion to enter the enlarged end of the hub, curved wedges between the ratchet faces of the ratchet portion of the spring drum and the enlarged end of the hub, a series of rollers between said ratchet faces and wedges and held between stops, and means for intermittently actuating said drum, substantially as described for the purpose set forth.

In testimony whereof I affix my signature in presence of two witnesses.

FRANK RISINGER.

Witnesses:
J. W. REED,
CLYDE R. LARKINS.